United States Patent [19]

Kamiya

[11] Patent Number: 5,425,098
[45] Date of Patent: Jun. 13, 1995

[54] DATA TRANSMITTER-RECEIVER HAVING ECHO CANCELER WITH DATA DELAY

[75] Inventor: Ryo Kamiya, Hamamatsu, Japan

[73] Assignee: Yamaha Corporation, Hamamatsu, Japan

[21] Appl. No.: 81,792

[22] Filed: Jun. 23, 1993

[30] Foreign Application Priority Data

Jun. 29, 1992 [JP] Japan .................................. 4-194872

[51] Int. Cl.⁶ .............................................. H04J 3/00
[52] U.S. Cl. .................................. 379/410; 370/32.1; 379/406
[58] Field of Search ............... 379/410, 411, 406, 345; 370/32, 32.1

[56] References Cited

U.S. PATENT DOCUMENTS

| | | | |
|---|---|---|---|
| 4,817,081 | 3/1989 | Wauda et al. | 379/411 X |
| 4,987,569 | 1/1991 | Ling et al. | 370/32.1 |
| 5,113,389 | 5/1992 | Cox | 379/410 X |

FOREIGN PATENT DOCUMENTS 2205468 12/1988 United Kingdom ................ 379/406

Primary Examiner—James L. Dwyer
Assistant Examiner—M. W. Shehata
Attorney, Agent, or Firm—Spensley Horn Jubas & Lubitz

[57] ABSTRACT

A data transmitter-receiver device transmits a forward data to a communication channel, and receives a backward data with a returning echo noise from the communication channel. The device is provided with a first modulator for modulating the forward data into a first digital signal. A D/A converter converts the modulated first digital signal into a corresponding outgoing analog signal which is transmitted to the communication channel. A delay memory is operated to delay the forward data by a certain time delay corresponding to a return time interval of an echo noise. A second modulator modulates the delayed forward data into a second digital signal. An A/D converter receives an incoming analog signal to convert the same into a corresponding third digital signal. An echo canceler operates based on the first and second digital signals for removing an echo noise from the third digital signal. A demodulator demodulates the third digital signal after removal of the echo noise to produce a backward data.

5 Claims, 3 Drawing Sheets

| Forward data | Phase angle of modulated digital signal |
|---|---|
| 0 0 1 | 45° |
| 0 0 0 | 90° |
| 0 1 0 | 135° |
| 0 1 1 | 180° |
| 1 1 1 | 225° |
| 1 1 0 | 270° |
| 1 0 0 | 315° |
| 1 0 1 | 0° |

DATA TRANSMITTER-RECEIVER HAVING ECHO CANCELER WITH DATA DELAY

BACKGROUND OF THE INVENTION

The present invention relates to a data transmitter-receiver for transmitting and receiving a digital data in two-way fashion through a communication channel such as a telephone channel. Particularly, the invention relates to an involved echo canceler having an efficient delay control.

Generally, in fast full-duplex communication of a digital data through an analog telephone channel, the conventional data transmitter-receiver is provided with a modulator/demodulator of an audio band and an echo canceler for removing an echo noise reflected back through the telephone channel. For example, the modulator/demodulator (modem) adopts a four-phase pulse modulation (PM) mode or an eight-phase differential pulse modulation mode. In such a mode, the modulator/demodulator generally carries out digital signal processing on a real time basis according to a value-sampling operation which uses a sample point as a variable, or according to a differential operation. In turn, the echo canceler deals with an echo noise containing a close-end echo component which is reflected by an own two-wire/four-wire conversion hybrid, and containing a far-end echo component which is reflected back from a remote or opposite two-wire/four-wire conversion hybrid. Particularly, with regard to signal processing of the far-end echo component, a delay operation is conducted by delaying a signal transmitted from the modem (hereinafter, referred to as a "forward signal") by a time interval which is needed for the forward signal to return as a corresponding echo noise through a communication channel. The delayed forward signal is used to remove the echo noise mixed with a received signal which the moderm receives through the communication channel (hereinafter, referred to as a "backward signal").

However, the conventional data transmitter-receiver applies the delay operation to a modulated form of the forward signal, thereby disadvantageously requiring a great capacity of a delay memory which is used for the delay operation. Particularly, in the case that a data transfer speed reaches up to 9600 bps, a vast capacity of the delay memory is required, thereby disadvantageously causing scale-up of the device size and increase of the power consumption.

SUMMARY OF THE INVENTION

In order to solve the above noted problems of the prior art, an object of the present invention is to save the capacity of the delay memory used for delay operation of a forward data in the removal of the echo noise so as to achieve scale-down and power consumption reduction in the data transmitter-receiver. The inventive data transmitter-receiver comprises first modulating means for modulating an initial forward data into a first digital signal. D/A converting means converts the modulated first digital signal into a corresponding outgoing analog signal which is transmitted to a communication channel. Delaying means delays the initial forward data by a certain time delay corresponding to a return time interval of an echo noise. Second modulating means modulates the delayed forward data into a second digital signal. A/D converting means converts an incoming analog signal which is received from the communication channel, into a corresponding third digital signal mixed with an echo noise. Echo canceler means operates based on the first and second digital signals for removing the echo noise from the third digital signal. Demodulating means demodulates the third digital signal after removal of the echo noise to reproduce a backward data substantially free of the echo noise.

In such a type of the data transmitter-receiver device, normally three to six bits of the forward data are modulated at once during each sampling period to produce a modulated digital signal composed of 10–16 bits. According to the invention, the initial forward data is delayed prior to the modulation in order to produce the first and second digital signals for use in removal of an echo noise from the third digital signal. Therefore, as compared to the prior art in which the once modulated digital signal of the multi-bit form is then subjected to the delay operation, the capacity of the required delay memory can be reduced by as much as one-half, thereby achieving scale-down and power saving of the device.

DETAILED DESCRIPTION OF THE INVENTION

Figure 1:
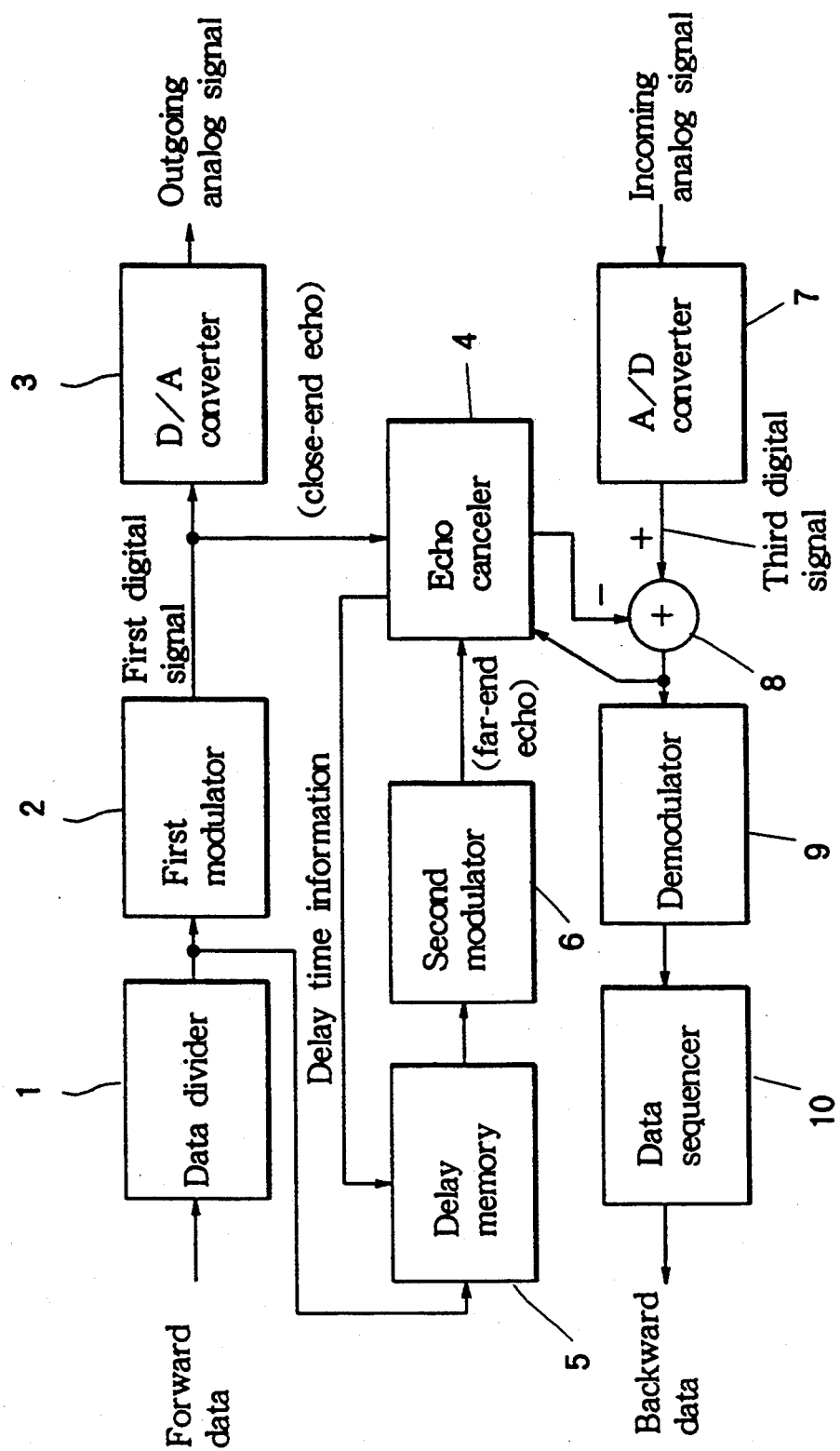
FIG. 1 is a block diagram showing a construction of the inventive data transmitter-receiver.

Hereinafter, embodiments of the invention will be described in conjunction with the attached drawings. FIG. 1 is a block diagram showing a basic construction of the inventive data transmitter-receiver device. The device includes a data divider 1 for successively dividing a given forward data composed of a serial train of binary bits "1" and "0", into each set of three consecutive bits. A first modulator 2 modulates each divided set of the serial forward data into a first digital signal composed of a pulse train. For example, the eight-phase differential pulse modulation is carried out as shown in the table diagram of FIG. 2. Namely, each divided set of three bits is encoded in terms of a phase angle of each corresponding pulse of the modulated first digital signal according to the value of each set. For example, a set of 0, 0, 1 corresponds to a phase angle of 45°. Another set of 0, 0, 0 corresponds to a phase angle of 90°. In such a manner, eight different sets of the three divided binary data are modulated to correspond to eight different phase angles. A D/A converter 3 converts the modulated first digital signal into a corresponding outgoing analog signal which is transmitted through a two-wire/four-wire conversion hybrid (not shown) and a communication channel such as a telephone channel, to a remote terminal of an opposite party. An echo canceler 4 is connected to the first modulator 2 to receive therefrom the same modulated first digital signal indicative of a close-end echo component.

Further, a delay memory 5 is connected to the data divider 1 to receive therefrom the serial forward data, set by set of three divided bits, and to output the same in a delayed manner by a given delay time interval which depends on parameters of the communication channel which constitutes a return path of an echo noise. In this embodiment, the delay time interval is determined according to information fed back from the echo canceler 4. A second modulator 6 is connected to the delay memory 5 to receive therefrom the delayed forward data. The second modulator 6 modulates the delayed forward data into a corresponding second digital signal according to the same modulation scheme as that of the first modulator 2. The modulated second digital signal is fed to the echo canceler 4, representative of a far-end echo component.

Moreover, an A/D converter 7 receives an incoming analog signal through the two-way/four-way conversion hybrid (not shown) and the communication channel from the remote terminal. The A/D converter 7 converts the incoming analog signal into a corresponding third digital signal which has been modulated by the remote terminal. An adder 8 receives the third digital signal at a positive input. The adder 8 has another negative input connected to the echo canceler 4. A demodulator 9 receives the third digital signal after removal of an echo noise through the adder 8 so as to demodulate the same into successive sets of three-bit data. This demodulation is conducted in reverse manner as the above-mentioned modulation scheme. A data sequencer 10 arranges the successive sets of three-bit data into a backward data composed of a serial train of binary bits "0" and "1", which is fed to a data processor (not shown).

In operation of the FIG. 1 device, the echo canceler 4 has an internal memory for storing an impulse response function h(t) indicative of an impulse response of the echo return path. The echo canceler 4 carries out folding computation among the impulse response function h(t) and the first and second digital signals, i.e., the close-end and far-end echo signals, thereby producing a compensative echo canceling signal. Then, the adder 8 subtracts the echo canceling signal from the incoming third digital signal to thereby cancel out the echo noise mixed with the incoming third digital signal. The thus obtained echo-free third digital signal is fed back to the echo canceler 4. The echo canceler 4 carries out adaptive control based on the fed-back third digital signal so as to adaptively set the internal impulse response function h(t) during the course of forward and backward data communication. Further, the echo canceler 4 feeds back the delay time interval information obtained as the result of the adaptive control, to the delay memory 5.

In the inventive constructive of the data transmitter-receiver device, the delay memory 5 receives directly the initial forward data to delay the same, rather than the modulated outgoing digial signal. By such a construction, a data volume to be delayed can be reduced by one-several-th as compared to the conventional device, thereby effectively saving a capacity of the delay memory 5. Further, in case that the modulation speed is relatively slow, the delay memory 5 is filled with a great number of bits "0", thereby saving the power consumption.

Figures 2, 3:
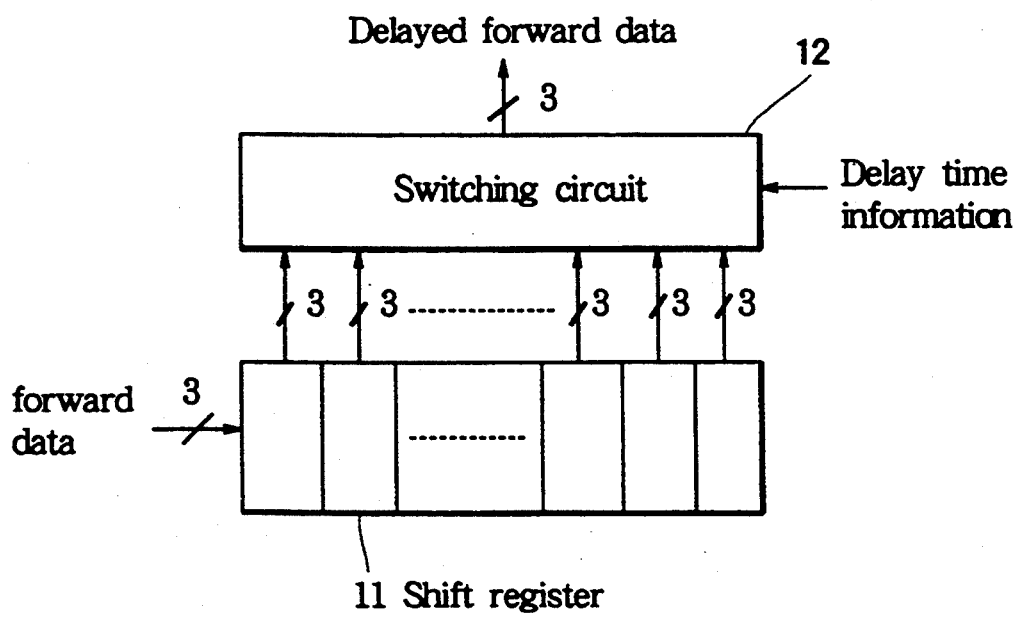
FIG. 2 is a table diagram showing the relation between the initial forward data and the phase-modulated digital signal.
FIG. 3 is a block diagram showing one embodiment of the delay memory.
Figure 4:
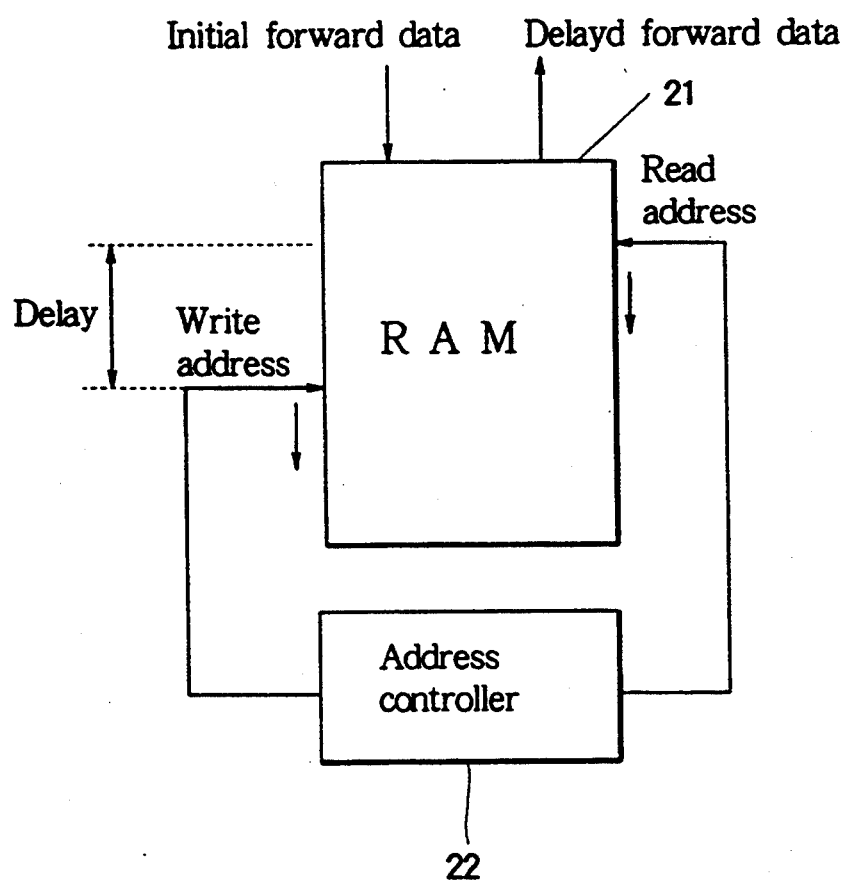
FIG. 4 is a block diagram showing another embodiment of the delay memory.

FIG. 3 shows one embodiment of the delay memory 5. The memory is provided with a shift register 11 for successively storing divided sets of the forward data. An output stage of the shift register 11 is sequentially selected by a switching circuit 12 according to the delay time interval information. FIG. 4 shows another embodiment of the delay memory. The memory is comprised of a RAM 21 for storing the initial forward data, and an address controller 22 for controlling writing/- reading operation of the RAM 21. The address controller 22 delays a read address signal relative to a write address signal by a certain amount determined according to the delay time interval information.

According to the recommendation V.17 regulated by CCITT (International Telegraph and Telephone Consultative and Telephone), the signal level of the far-end echo noise should be reduced by 54 dB. The conventional method realized by delaying a pre-modulated signal, as described in the background of the invention, requires about 9 bits for each data to accord with the 54 dB requirement. In the modulation operation, an amplitude data and a phase data are involved for each sample value, and therefore, 18 bits are necessary for each sample data. On the contrary, the inventive method realized by modulating after the delaying operation according to the present invention requires 6 bits per sample. As a result, the present invention requires only one-third the data amount to perform echo-cancel operation. Therefore, the necessary memory amount can be reduced.

As described above, according to the invention, the initial forward data is subjected to the delay operation prior to the modulation so as to produce a signal indicative of a far-end echo for use in the echo removal. Therefore, in contrast to the prior art in which a once modulated signal is then delayed, the inventive device can reduce a capacity of the delay memory by as much as one-half, thereby advantageously achieving scale-down and power saving of the device.

What is claimed is:

1. A device for transmitting a forward data to a communication channel and receiving a backward data with a returning echo noise from the communication channel, the device comprising:

input means for processing the forward data to produce a serial data of predetermined length, the input means including a data divider for sequentially dividing a serial bit train of the forward data into sets of multiple bits;

first modulating means for modulating the serial data and outputting a first digital signal as a close-end echo, the first modulating means including means for pulse-modulating each set of the multiple bits in terms of phase angle;

D/A converting means for converting the first digital signal into a corresponding outgoing analog signal which is transmitted to the communication channel;

delaying means for delaying the serial data by a certain time data corresponding to a return time interval of an echo noise;

second modulating means for modulating the delayed serial data and outputting a second digital signal as a far-end echo;

A/D converting means for converting an incoming analog signal which is received from the communication channel, into a corresponding third digital signal;

echo canceler means operative based on the first and second digital signals for removing an echo noise from the third digital signal and for feeding said certain time data to the delaying means; and demodulating means for demodulating the third digital signal after removal of the echo noise to produce the backward data.

2. A device according to claim 1, wherein the delaying means comprises a shift register having a plurality of memory stages for sequentially storing the serial data, and a switching circuit for sequentially selecting the memory stages with a certain time delay according to the return time interval of the echo noise to thereby read out the stored serial data in a delayed manner.

3. A device according to claim 1, wherein the delaying means comprises a RAM memory for storing the serial data in response to a write address signal, and an address controller for applying to the RAM a read address signal with a given time delay relative to the write address signal according to the return time interval of the echo noise so as to read out the stored serial data in a delayed manner.

4. A device according to claim 1, wherein the echo canceler means includes means for storing an impulse response function adaptively settable according to an impulse response of the communication channel, means for processing the first and second digital signals with the impulse response function to produce an echo canceling signal effective to cancel out the echo noise contained in the third digital signal, and means for feeding back a value of the return time interval to the delaying means according to processing results of the first, second and third digital signals.

5. A device for transmitting a forward data to a communication channel and receiving a backward data with a returning echo noise from the communication channel, the device comprising:

first modulating means for modulating the forward data and outputting a first digital signal as a close-end echo;

D/A converting means for converting the first digital signal into a corresponding outgoing analog signal which is transmitted to the communication channel;

delaying means for delaying the forward data by a certain time data corresponding to a return time interval of an echo noise;

second modulating means for modulating the delayed forward data and outputting a second digital signal as a far-end echo;

A/D converting means for converting an incoming analog signal which is received from the communication channel, into a corresponding third digital signal;

echo canceler means operative to perform echo cancellation based on the first and second digital signals for removing an echo noise from the third digital signal, the echo canceler means including feedback means directly connected to the delaying means for feeding back a value of the certain time data in an adaptive manner according to results of the echo cancellation; and demodulating means for demodulating the third digital signal after removal of the echo noise to produce the backward data.

* * * * *